(12) United States Patent
Luick et al.

(10) Patent No.: US 9,381,594 B2
(45) Date of Patent: Jul. 5, 2016

(54) LASER CLADDING WITH A LASER SCANNING HEAD

(71) Applicant: CATERPILLAR INC., Peoria, IL (US)

(72) Inventors: Kegan Luick, Corinth, MS (US);
Thierry Andre Marchione, Edgewood, NM (US); Justin Curtis Embrey, Morton, IL (US); Daniel Cavanaugh, Chillicothe, IL (US); Waylon Scott Walker, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 435 days.

(21) Appl. No.: 14/071,419

(22) Filed: Nov. 4, 2013

(65) Prior Publication Data

US 2015/0122783 A1   May 7, 2015

(51) Int. Cl.
*B23K 26/342* (2014.01)
*B23K 26/34* (2014.01)
*B23K 26/08* (2014.01)
*B23K 26/30* (2014.01)

(52) U.S. Cl.
CPC ............. *B23K 26/34* (2013.01); *B23K 26/082* (2015.10); *B23K 26/0807* (2013.01); *B23K 26/342* (2015.10); *B23K 26/421* (2013.01); *B23K 26/60* (2015.10)

(58) Field of Classification Search
CPC .............................. B23K 26/34; B23K 26/342
USPC ............................. 219/121.63, 121.64, 121.85
See application file for complete search history.

(56) References Cited

U.S. PATENT DOCUMENTS

| 3,952,180 | A | | 4/1976 | Gnanamuthu | |
|---|---|---|---|---|---|
| 4,857,697 | A | * | 8/1989 | Melville | B23K 26/0613 219/121.63 |
| 5,193,732 | A | * | 3/1993 | Interrante | B23K 20/10 228/1.1 |
| 7,385,157 | B2 | * | 6/2008 | Oda | B23K 26/0608 219/121.63 |
| 2013/0140279 | A1 | | 6/2013 | Bruck et al. | |

FOREIGN PATENT DOCUMENTS

| CN | 102383126 A | 3/2012 |
|---|---|---|
| DE | 102010048335 | 4/2012 |
| JP | 63224888 | 9/1988 |
| WO | 2008098680 A1 | 8/2008 |

OTHER PUBLICATIONS

Unpublished U.S. Appl. No. 14/022,957, filed Sep. 10, 2013 in 23 pages.
Tuominen et al. "High Deposition Rate Laser Cladding: Recent Advancements", Tampere University of Technology, Feb. 2, 2013, 44 pages.

* cited by examiner

*Primary Examiner* — Samuel M Heinrich
(74) *Attorney, Agent, or Firm* — Procopio, Cory, Hargreaves & Savitch LLP

(57) ABSTRACT

A method for laser cladding a material onto a surface of a machine component using a laser scanning head with laser scanning optics is disclosed. The method includes forming a molten bead of cladding material by directing a beam with the laser scanning optics over a bead scan on the machine component. The method also includes directing the beam with the laser scanning optics over a secondary scan on the machine component, the secondary scan being offset from the bead scan at a predetermined distance on the machine component.

20 Claims, 3 Drawing Sheets

LASER CLADDING WITH A LASER SCANNING HEAD

TECHNICAL FIELD

The present disclosure generally pertains to machine component cladding, and is more particularly directed toward a machine component cladding scan cycle for cleaning, cladding, and thermal management of the machine component surface.

BACKGROUND

Lasers have innumerable different applications in modern industry. Lasers are used to directly melt materials and to preheat parts, as well as in a great many different diagnostic and process control applications. Among other things, in the field of welding lasers offer the advantages of precise control over the spatial and temporal delivery of heat energy. One specialized type of laser welding is known as laser cladding, where a beam is used to melt a feedstock material in contact with or prior to contacting a part to be clad. In some instances the feedstock material is supplied in the form of a sprayed or pre-placed powder or the like, and in others in the form of a wire.

Cladding of certain parts has long been recognized as a strategy for improving the performance and/or service life of all or certain areas of a part, and laser cladding techniques can provide for great process efficiency in many instances. U.S. Pat. No. 3,952,180 to Gnanamuthu is directed to a metal layer that is clad to a metal substrate by laying spaced rods or wires of a cladding metal on the substrate surface and scanning the cladding metal with a continuously operating beam, part of which impinges directly on the cladding metal to melt it and part of which impinges on the adjacent surface area of the substrate to improve flow of molten metal thereon. The cladding metal may be fed to the substrate surface in synchronism with beam scanning. The process produces a clad layer of the cladding metal on the substrate characterized by a fine and homogeneous structure within the clad on layer. The surface of the clad may be smoothed by locally oscillating the beam during the course of cladding and/or by multiple passes.

The present disclosure is directed toward overcoming one or more of the problems discovered by the inventors or that is known in the art.

SUMMARY OF THE DISCLOSURE

In one aspect, a method for laser cladding a material onto a surface of a machine component using a laser scanning head with laser scanning optics is disclosed. The method performing a bead scan of a bead scanning pattern by directing a beam with the laser scanning optics over a bead scan on the machine component, forming a molten bead of cladding material at the surface of the machine component. The method also includes directing the beam with the laser scanning optics over a secondary scan on the machine component, the secondary scan being offset from the bead scan at a predetermined distance on the machine component.

In another aspect, a laser cladding system for cladding a material to a surface of a machine component is disclosed. The laser cladding system includes a laser scanning head and a laser control system. The laser scanning head includes a laser source which produces a beam and laser scanning optics which receives and directs the beam. The laser control system includes a processor, a beading module, and a pre-cleaning module. The beading module is configured to control the laser scanning head to direct the beam with the laser scanning optics during a bead scan to form a molten bead of cladding material at the surface of the machine component. The pre-cleaning module is configured to control the laser scanning head to direct the beam with the laser scanning optics during a pre-clean scan to remove impurities from the surface prior to a bead scan.

DETAILED DESCRIPTION

The systems and methods disclosed herein include a laser cladding system including a laser scanning head for cleaning, cladding, and thermal management during a laser cladding process. In embodiments, the laser scanning head directs a single beam in a laser cladding cycle that includes one or more bead scanning patterns. Each bead scanning pattern may include a bead scan, a pre-clean scan, a pre-heat scan, and a post-heat scan, combining multiple processing steps into a single piece of hardware. The pre-clean scan, pre-heat scan, and post-heat scan may remove impurities and slag, and may mitigate, prevent, or reduce cracking or formation of other microstructure problems.

Figure 1:
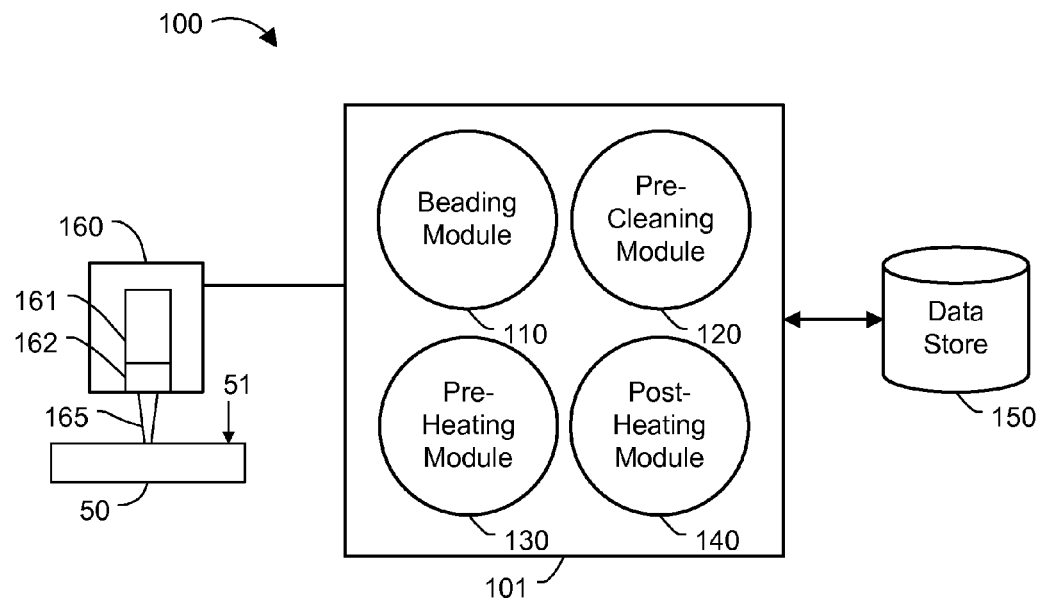
FIG. 1 is a functional block diagram of a laser cladding system.

FIG. 1 is a functional block diagram of a laser cladding system 100. Laser cladding system 100 includes a laser scanning head 160 and a laser control system 101. Laser scanning head 160 is configured to direct and scan the focused spot of the laser energy or beam 165 along the surface 51 of the machine component 50 for a laser cladding process. The laser energy may be very coherent light or more generally electromagnetic radiation. The laser cladding system 100 and laser cladding process disclosed herein may be used to manufacture, repair, or remanufacture machine component 50.

The laser cladding process may include multiple laser cladding cycles, where each laser cladding cycle forms a layer of cladding material on the surface 51. Each laser cladding cycle includes at least one bead scanning pattern. One bead of material may be formed each time the bead completes a bead scanning pattern. The laser control system 101 may control or instruct the laser scanning head 160 to direct the beam 165 over the bead scanning pattern or patterns. The laser scanning head 160 includes a laser or laser source 161 and scanning optics 162. The laser 161 produces the beam 165. The scanning optics receive and direct the beam 165 along the bead scanning pattern and over each laser cladding cycle. The scanning optics may include multiple oscillating minors and stepper motors that are configured to mechanically control the minors to move or redirect the beam 165. Piezoelectric actuators, servo motors, or pneumatic devices may also be used to mechanically control or move the minors.

Laser control system 101 may be implemented on a computer, server, or manufacturing machine such as a computer numerical control (CNC) machine that includes a processor for executing computer instructions, and a memory that can be used to store executable software modules that can be executed by the processor. The memory includes a non-transitory computer readable medium used to store information or software modules executable by the processor. The laser control system 101 may include a beading module 110, a pre-cleaning module 120, a pre-heating module 130, a post-heating module 140, and a data store 150. Each module may control the beam 165 over a portion of each bead scanning pattern. The laser control system 101 may control the movement of the stepper motors and oscillating minors to control the beam 165 including the focus spot and path of the beam 165.

Figures 2, 3, 4:
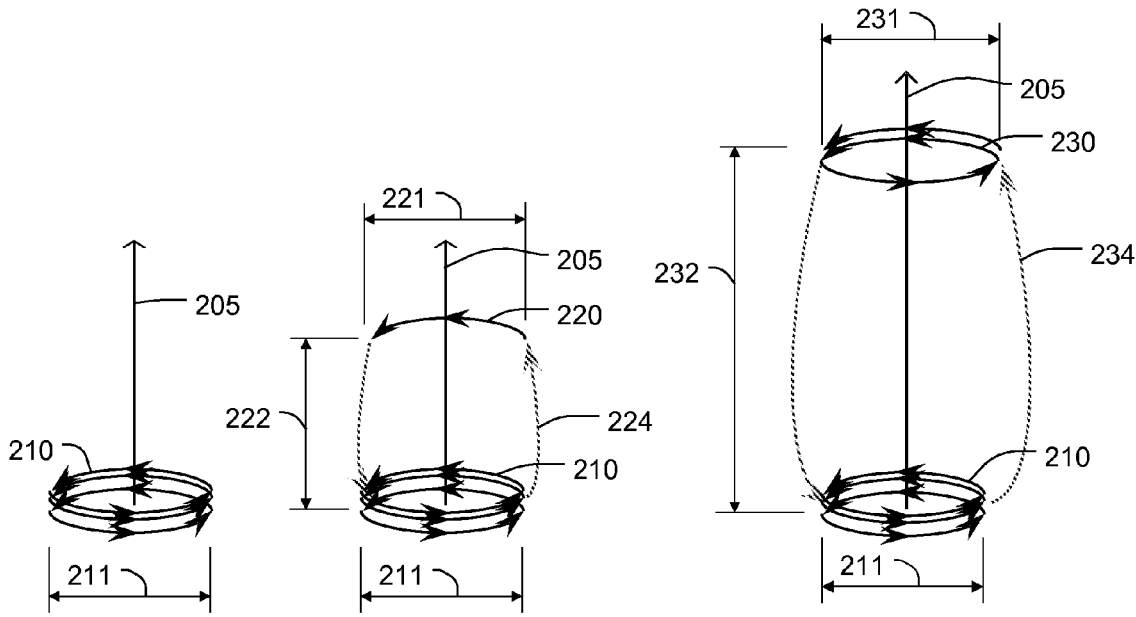
FIG. 2 is a schematic illustration of a bead scan.
FIG. 3 is a schematic illustration of a bead scan and a pre-clean scan.
FIG. 4 is a schematic illustration of a bead scan and a pre-heat scan.

Beading module 110 may control or instruct the laser scanning head 160 to direct the beam 165 during a bead scan and may control a supply of feedstock during each bead scan. FIG. 2 is a schematic illustration of a bead scan 210. The page surface simulates the surface 51 of the machine component 50. The beading module 110 controls or instructs the laser scanning head 160 to direct the beam 165 across a bead scan length 211. Each time the beam 165 is directed across the bead scan length 211 may be considered a pass. The bead scan 210 may include one or more passes. In the embodiment illustrated in FIG. 2, the bead scan 210 includes multiple passes. In FIG. 2 each pass is shown as an arc, with the passes being slightly offset, for illustration. Often each pass of a bead scan 210 is linear, or in a straight line. The straight line may be perpendicular to the cladding direction 205. Other curves and loops may also be used. Generally, each pass of a bead scan 210 is directly over the previous pass or passes.

The beam 165 melts the surface of the substrate or machine component 50 and clads the feedstock material to the machine component 50 forming a molten bead over the bead scan length 211. After completion of the bead scan 210, the beading module 110 may control or instruct the laser scanning head 160 to direct the beam 165 to move in the cladding direction 205 and perform a subsequent bead scan to form the next molten bead, which may be adjacent the previous molten bead. The beam 165 may continue to be directed forward along the surface 51 in the cladding direction 205 to perform each bead scan in the laser cladding cycle.

The supply of feedstock may coincide with the movement of the beam 165 during the bead scan 210. The feedstock may be supplied as a powdered material, a wire, or the like. The feedstock or cladding material may be similar in composition to the substrate or may be a hard facing tool steel material such as 4140, 4340, or other similar materials, although the present disclosure is not thereby limited.

Pre-cleaning module 120 may control or instruct the laser scanning head 160 to direct the beam 165 during a pre-clean scan 220. FIG. 3 is a schematic illustration of a bead scan 210 and a pre-clean scan 220. Similar to FIG. 2, the page surface simulates the surface 51 of the machine component 50. The bead scan 210 illustrated in FIG. 3 is the same as the bead scan 210 illustrated in FIG. 2. The pre-cleaning module 120 controls or instructs the laser scanning head 160 to direct the beam 165 across a pre-clean scan length 221. The pre-clean scan length 221 may be equal to the bead scan length 211. Each time the beam 165 is directed across the pre-clean scan length 221 may be considered a pass. The pre-clean scan 220 may include one or more passes. In the embodiment illustrated in FIG. 3, the pre-clean scan 220 includes a single pass.

While the pass of the pre-clean scan 220 is shown as an arc, the pre-clean scan 220 is often linear or a straight line. The straight line may be perpendicular to the cladding direction 205. Other curves and loops may also be used. Generally, each pass of a pre-clean scan 220 is directly over the previous pass or passes.

The pre-clean scan 220 may be offset from the bead scan 210 at pre-clean scan distance 222, ahead of the bead scan 210 in the cladding direction 205. The pre-clean scan 220 is generally forward of the bead scan 210. The pre-cleaning module 120 may control or instruct the laser scanning head 160 to direct the beam 165 to and from the location of the pre-clean scan 220 along a pre-clean offset path 224, shown dashed. The pre-clean offset path 224 to and from the pre-clean scan 220 may occur at either end of the bead scan length 211 and may both occur on the same end of the bead scan length 211. The power of the beam 165 may be reduced or the beam 165 may be pulsed off while traveling along the pre-clean offset path 224.

The pre-clean scan 220 performed at a pre-clean scan distance from the bead scan 210 may occur before, after, or may be interwoven with the bead scan 210. For example a first number of passes for the bead scan 210 may be performed prior to the pre-clean scan 220 and a second number of passes for the bead scan 210 may be performed after the pre-clean scan 220. The power or intensity of the beam 165 during the pre-clean scan 220 may be the same or different than the power or intensity of the beam 165 during the bead scan 210. Similarly, the speed that the beam 165 travels for the pre-clean scan 220 may be the same or different than the speed the beam 165 travels for the bead scan 210.

Pre-heating module 130 may control or instruct the laser scanning head 160 to direct the beam 165 during a pre-heat scan 230. FIG. 4 is a schematic illustration of a bead scan 210 and a pre-heat scan 230. Similar to FIG. 2, the page surface simulates the surface 51 of the machine component 50. The bead scan 210 illustrated in FIG. 4 is the same as the bead scan 210 illustrated in FIG. 2. The pre-heating module 130 controls or instructs the laser scanning head 160 to direct the beam 165 across a pre-heat scan length 231. The pre-heat scan length 231 may be equal to the bead scan length 211. Each time the beam 165 is directed across the pre-heat scan length 231 may be considered a pass. The pre-heat scan 230 may include one or more passes. In the embodiment illustrated in FIG. 4, the pre-heat scan 230 includes a three passes. While the passes of the pre-heat scan 230 are shown as arcs that are slightly offset (for illustration), the pre-heat scan 230 is often linear or a straight line. The straight line may be perpendicular to the cladding direction 205. Other curves and loops may also be used. Generally, each pass of a pre-heat scan 230 is directly over the previous pass or passes.

The pre-heat scan 230 may be offset from the bead scan 210 at pre-heat scan distance 232, ahead of the bead scan 210 in the cladding direction 205. The pre-heat scan 230 is generally forward of the bead scan 210. The pre-heating module 130 may control or instruct the laser scanning head 160 to direct the beam 165 to and from the location of the pre-heat scan 230 along a pre-heat offset path 234, shown dashed. The pre-heat offset path 234 to and from the pre-heat scan 230 may occur at either end of the bead scan length 211 and may both occur on the same end of the bead scan length 211. The power of the beam 165 may be reduced or the beam 165 may be pulsed off while traveling along the pre-heat offset path 234.

The pre-heat scan 230 performed at a pre-heat scan distance from the bead scan 210 may occur before, after, or may be interwoven with the bead scan 210. For example a first number of passes for the bead scan 210 may be performed prior to the pre-heat scan 230 and a second number of passes for the bead scan 210 may be performed after the pre-heat scan 230. The power or intensity of the beam 165 during the pre-heat scan 230 may be the same or different than the power or intensity of the beam 165 during the bead scan 210. Similarly, the speed that the beam 165 travels for the pre-heat scan 230 may be the same or different than the speed the beam 165 travels for the bead scan 210.

Figure 5:
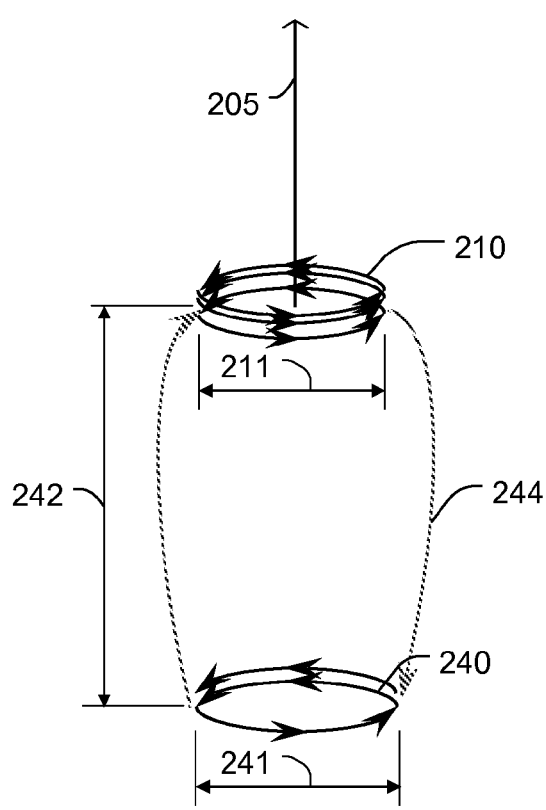
FIG. 5 is a schematic illustration of a bead scan and a post-heat scan.

Post-heating module 140 may control or instruct the laser scanning head 160 to direct the beam 165 during a post-heat scan 240. FIG. 5 is a schematic illustration of a bead scan 210 and a post-heat scan 240. Similar to FIG. 2, the page surface simulates the surface 51 of the machine component 50. The bead scan 210 illustrated in FIG. 5 is the same as the bead scan 210 illustrated in FIG. 2. The post-heating module 140 controls or instructs the laser scanning head 160 to direct the beam 165 across a post-heat scan length 241. The post-heat scan length 241 may be equal to the bead scan length 211. Each time the beam 165 is directed across the post-heat scan length 241 may be considered a pass. The post-heat scan 240 may include one or more passes. In the embodiment illustrated in FIG. 5, the post-heat scan 240 includes a three passes. While the passes of the post-heat scan 240 are shown as arcs that are slightly offset (for illustration), the post-heat scan 240 is often linear or a straight line. The straight line may be perpendicular to the cladding direction 205. Other curves and loops may also be used. Generally, each pass of a post-heat scan 240 is directly over the previous pass or passes.

The post-heat scan 240 may be offset from the bead scan 210 at post-heat scan distance 242, behind the bead scan 210, in the direction opposite the cladding direction 205. The post-heat scan 240 is generally aft of the bead scan 210. The post-heating module 140 may control or instruct the laser scanning head 160 to direct the beam 165 to and from the location of the post-heat scan 240 along a post-heat offset path 244, shown dashed. The post-heat offset path 244 to and from the post-heat scan 240 may occur at either end of the bead scan length 211 and may both occur on the same end of the bead scan length 211. The power of the beam 165 may be reduced or the beam 165 may be pulsed off while traveling along the post-heat offset path 244.

The post-heat scan 240 performed at a post-heat scan distance 242 from the bead scan 210 may occur before, after, or may be interwoven with the bead scan 210. For example a first number of passes for the bead scan 210 may be performed prior to the post-heat scan 240 and a second number of passes for the bead scan 210 may be performed after the post-heat scan 240. The power or intensity of the beam 165 during the post-heat scan 240 may be the same or different than the power or intensity of the beam 165 during the bead scan 210. Similarly, the speed that the beam 165 travels for the post-heat scan 240 may be the same or different than the speed the beam 165 travels for the bead scan 210.

Figure 6:
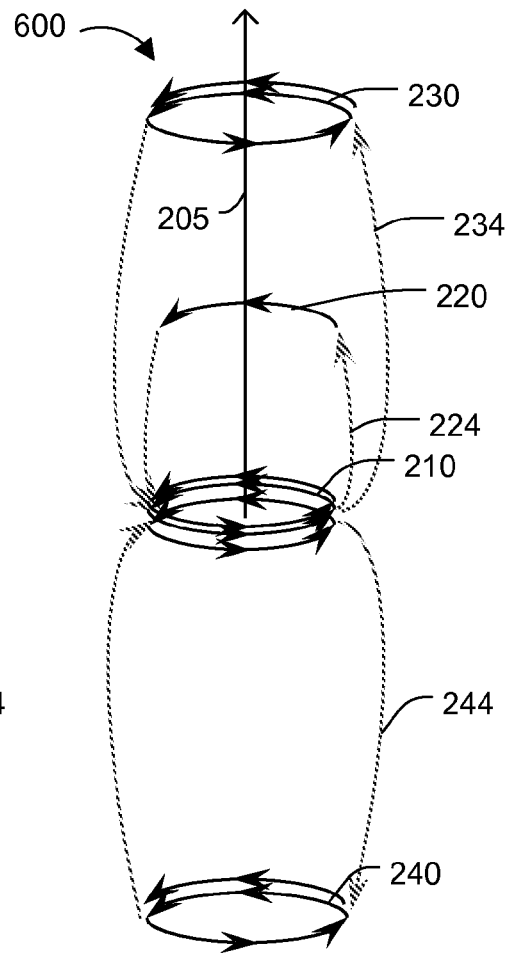
FIG. 6 is a schematic illustration of a bead scanning pattern 600 including the bead scan 210 of FIG. 2, the pre-clean scan 220 of FIG. 3, the pre-heat scan 230 of FIG. 4, and the post-heat scan 240 of FIG. 5.

Laser control system 101 may include any combination of the modules described above and may control or instruct the laser scanning head 160 to direct the beam 165 over any combination of the bead scan 210, pre-clean scan 220, pre-heat scan 230, and post-heat scan 240. Any combination of the bead scan 210, pre-clean scan 220, pre-heat scan 230 and post-heat scan 240 may be combined into a bead scanning pattern that may be repeated during a laser cladding cycle. FIG. 6 is a schematic illustration of a bead scanning pattern 600 including the bead scan 210 of FIG. 2, the pre-clean scan 220 of FIG. 3, the pre-heat scan 230 of FIG. 4, and the post-heat scan 240 of FIG. 5. The scans may be performed in any order and may be interwoven. The pre-clean offset path 224, the pre-heat offset path 234, and the post-heat offset path 244 may each be modified to travel to or from any of the other scans within the bead scan pattern, depending on the order in which each scan is performed.

While the cladding direction 205 or cladding path is illustrated as a straight line in FIGS. 2-6, the cladding path may include paths such as zigzag and circular paths.

The laser cladding system 100 may also include a data store 150. The data store 150 may include the data for each laser cladding cycle including bead scanning patterns, bead scans, pre-clean scans, pre-heat scans, and post heat scans. This data may include, inter alia, scan lengths, distances, and paths.

INDUSTRIAL APPLICABILITY

Machine components such as cam shafts, crank shafts, pump shafts, gears, seals, and other high performance applications may be subjected to relatively harsh conditions while in service resulting in various forms of wear and/or damage to the machine component. A hardened coating may be applied to the surface of the machine component prior to use to increase the service time of the machine component. The machine component may also be rebuilt or re-coated in a remanufacturing process to further increase the service time of the machine component.

Figure 7:
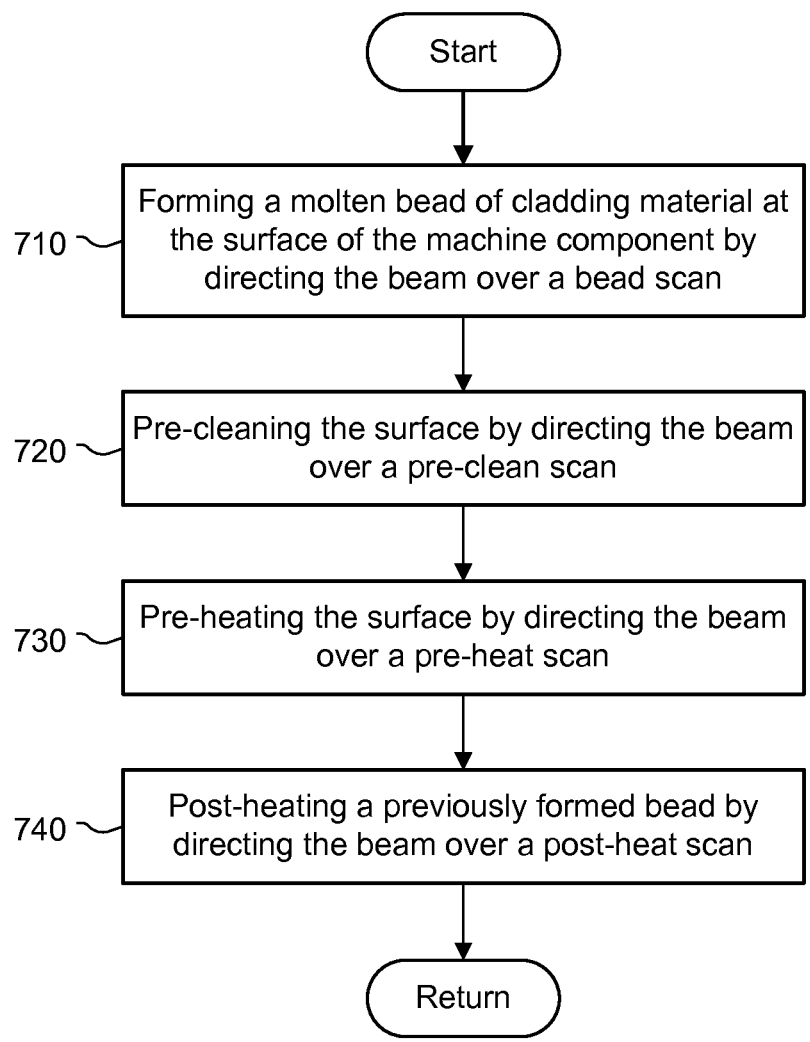
FIG. 7 is a flowchart of a method for a laser cladding cycle used during a laser cladding process for applying one or more layers of a material to a machine component.

FIG. 7 is a flowchart of a method for a bead scanning pattern used during a laser cladding process for applying one or more layers of a material to a machine component 50. The various steps of the method can be performed by the laser cladding system 100 of FIG. 1. The method may include forming a molten bead of cladding material at the surface 51 of the machine component 50 by directing the beam 165 over a bead scan, such as the bead scan 210 of FIG. 2, at block 710. The molten bead of material includes the cladding material or feedstock. The beading module 110 may control or determine, inter alia, the number of passes of the beam 165, intensity of the beam 165, width of the beam 165, location of the bead scan, and speed of the beam 165 during the bead scan.

The method may also include pre-cleaning the surface 51 by directing the beam 165 over a pre-clean scan, such as the pre-clean scan 220 of FIG. 3, at block 720. The pre-clean scan is forward of the bead scan to clean and prepare the surface 51 of the machine component 50 or substrate for a subsequent bead scan and to receive a subsequent bead.

A machine component made from a less expensive material such as cast iron may include impurities such as graphite at the surface and may be sensitive to thermal changes. Similarly, previously formed beads may include slag and impurities at the surface. Pre-cleaning the surface prior to forming a bead on the surface may remove the slag and impurities from the surface and may improve the bonded quality of the bead to the substrate or to a previous bead by preventing or reducing any porosity that may form when impurities are present on the surface of the substrate. The pre-cleaning module 120 may control or determine, inter alia, the number of passes of the beam 165, intensity of the beam 165, width of the beam 165, location of the pre-clean scan, including the pre-clean scan distance, and speed of the beam 165 during the pre-clean scan.

The method may further include pre-heating the surface 51 by directing the beam over a pre-heat scan, such as the pre-heat scan 230 of FIG. 4, at block 730. The pre-heat scan is forward of the bead scan to pre-heat and prepare the surface 51 of the machine component 50 or substrate for a subsequent bead scan and to receive a subsequent bead.

The cladding material may be subject to the formation of flaws such as cracking, porosity, and other microstructure flaws. Generally, an increase in the hardness of the material applied increases the susceptibility of the material to these microstructure flaws. Machine components with a hardness above Rockwell C 45, Rockwell C 48, or Rockwell C 50 may especially be subject to such flaws. The flaws may result from a differential between the surface temperature of the machine component or previously applied beads, and the current bead of cladding material.

The pre-heat scan may be configured to control the temperature differential between the molten bead of cladding material and a portion of the surface in contact with the molten bead of cladding material. Pre-heating the surface 51 prior to forming the molten bead of cladding material may reduce or control the temperature differential by increasing the temperature of the surface 51 or previously applied beads prior to forming a the molten bead at that location. Reducing the temperature differential may reduce or prevent the flaws, such as cracks, from forming. The pre-heating module 130 may control or determine, inter alia, the number of passes of the beam 165, intensity of the beam 165, width of the beam 165, location of the pre-heat scan, including the pre-heat scan distance, and speed of the beam 165 during the pre-heat scan.

The method may yet further include post-heating a previously formed bead by directing the beam over a post-heat scan, such as the post-heat scan 240 of FIG. 4, at block 740. The post-heat scan is aft of or behind the bead scan to re-heat a bead formed during a previous bead scan.

Flaws such as cracking, porosity, and other microstructure flaws in machine components may also result when the beads cool too quickly, especially for machine components with a hardness above Rockwell C 45, Rockwell C 48, or Rockwell C 50.

The post-heat scan may be configured to control the cooling period of the molten bead of cladding material or of a previously formed bead of cladding material. Performing a post-heat scan and passing the beam back over the bead may reduce the formation of the flaws by reducing the cooling rate of the bead. The post-heating module 140 may control or determine, inter alia, the number of passes of the beam 165, intensity of the beam 165, width of the beam 165, location of the post-heat scan, including the post-heat scan distance, and speed of the beam 165 during the post-heat scan.

The pre-clean, pre-heat, and post-heat scans may each be considered a secondary scan, each being offset from the bead scan by a predetermined distance. The predetermined distance for each secondary scan may depend on the desired time between a secondary scan and the bead scan at the same location, the desired temperature differences, and the desired cooling periods for the beads. Each of the secondary scans occurs along the surface 51 or a portion of the surface. The beam is directed through a laser cladding cycle, which generally moves in the cladding direction, to form multiple beads of cladding material along the surface 51 of the machine component 50.

Combining the secondary scans, the pre-cleaning, pre-heating, and post-heating, in a laser cladding cycle may further reduce the formation of flaws in the cladded material, especially for machine components or material with a hardness above Rockwell C 55 or between Rockwell C 55-60. The combination of pre-heating and post-heating may also result in efficiency gains. The pre-heat scans and post-heat scans may reduce the peaks and valleys that form during bead on bead applications, which may result in a smoother clad region and improved material efficiency.

When applying a layer of cladding material or beads to a machine component 50, multiple bead scanning patterns using various combinations of blocks 710, 720, 730, and 740 may be performed. For example, multiple bead scanning patterns or portions of bead scanning patterns including a pre-clean scan and/or a pre-heat scan may be performed prior to performing a bead scanning pattern including a bead scan so as to pre-clean/pre-heat the surface 51 at the initial starting point of the laser cladding process. The pre-clean and pre-heat scans are performed ahead of the bead scan and post-heat scan is performed behind the bead scan.

In one embodiment, the multiple bead scanning patterns include a bead scan and a pre-clean scan. In another embodiment, the multiple bead scanning patterns also include at least one pre-heat scan. In a further embodiment, the multiple bead scanning patterns also include at least on post-heat scan. For example, a laser cladding process along an overall circular path may be subject to cracking at the location between the first and last beads formed on the surface. As such, the majority of bead scanning patterns performed in this example may include a bead scan and pre-clean scan, while one or more bead scanning patterns performed towards the end of the cladding process may also include a pre-heat scan to pre-heat the first bead prior to forming the last bead adjacent the first bead.

The use of a laser scanning head 160 with scanning optics 162 may not require or limit the movement of the laser scanning head 160 or the work piece to move the beam 165, reducing the equipment requirements for the laser cladding process. The beam 165 may be controlled by the scanning optics 162 of the laser scanning head 160 while the laser scanning head 160 is held stationary. In some embodiments the laser scanning head 160 may move forward in the cladding direction 205 to deliver the feedstock while performing the various scans. Reducing the equipment requirements along with using a single beam 165 during the laser cladding process may also reduce the system power requirements.

The cladding, pre-cleaning, pre-heating, and post-heating scans may each require different energy levels. The energy levels for each scan may be reached by varying the power level of the beam 165, varying the beam dimension, by pulsing the beam 165 through the scan, or by any combination thereof. The power levels of the beam 165 may also be changed over the scan to overcome the geometry of certain parts or to shape the cladding bead.

The scanning optics 162 may be capable of forming a beam 165 from 30 millimeters to 50 millimeters wide and may move the beam 165 quick enough to keep an area of the substrate molten, forming a bead, while performing a pre-clean scan, a pre-heat scan and a post-heat scan. Mechanically moving a laser head or a substrate relative to a laser head may not be fast enough to keep an area of the substrate molten, while performing a pre-clean scan, a pre-heat scan and a post-heat scan.

When performing multiple passes in a scan or when the beam changes directions the speed of the beam 165 may slow down to zero at the return point before accelerating back for the next pass. The energy of beam 165 may be at a maximum at the return point and may deeply fuse the machine component at the return point. The movement of the beam 165 or scanning motion may be modulated to reduce the energy of the beam 165 at the return point and the effects thereof. The modulation may be performed with a signal emitted from a generator. The signal can have different wave shapes including, inter alia, sinusoidal and triangular.

Those of skill will appreciate that the various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the design constraints imposed on the overall system. Skilled persons can implement the described functionality in varying ways for each particular application, but such implementation decisions should not be interpreted as causing a departure from the scope of the invention. In addition, the grouping of functions within a module, block, or step is for ease of description. Specific functions or steps can be moved from one module or block without departing from the invention.

The various illustrative logical blocks and modules described in connection with the embodiments disclosed herein can be implemented or performed with a general purpose processor, a digital signal processor (DSP), application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor (e.g., of a computer), or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A method for laser cladding a material onto a surface of a machine component using a laser scanning head with laser scanning optics, the method comprising:
    forming a molten bead of cladding material by directing a beam with the laser scanning optics over a bead scan on the machine component; and
    directing the beam with the laser scanning optics over a secondary scan on the machine component, the secondary scan being offset from the bead scan at a predetermined distance on the machine component.

2. The method of claim 1, wherein the secondary scan is a pre-clean scan performed forward of the bead scan to clean and prepare the surface to receive a subsequent bead.

3. The method of claim 1, wherein the secondary scan is a pre-heat scan performed forward of the bead scan to pre-heat and prepare the surface to receive a subsequent bead.

4. The method of claim 1, wherein the secondary scan is a post-heat scan performed aft of the bead scan to re-heat a previously formed bead.

5. The method of claim 1, wherein a first number of passes for the bead scan is performed prior to the secondary scan and a second number of passes for the bead scan is performed after the secondary scan.

6. The method of claim 2, further comprising pre-heating the surface by directing the beam over a pre-heat scan forward of the bead scan to prepare the surface to receive a subsequent bead.

7. The method of claim 6, further comprising post-heating a previously formed bead by directing the beam over a post-heat scan aft of the bead scan.

8. The method of claim 7, wherein the pre-clean scan is offset from the bead scan by a first distance, the pre-heat scan is offset from the bead scan by a second distance, and the post-heat scan is offset from the bead scan by a third distance.

9. The method of claim 7, wherein the pre-heat scan is configured to control a temperature differential between the molten bead of cladding material and a portion of the surface in contact with the molten bead of cladding material, and the post-heat scan is configured to control a cooling period of the molten bead of cladding material.

10. The method of claim 1, wherein the laser scanning optics include minors and stepper motors that are configured to mechanically control the mirrors to redirect the beam over the bead scan and the secondary scan.

11. A method for laser cladding a material onto a surface of a machine component using a laser scanning head including laser scanning optics and a laser, the method comprising:
    directing a beam of the laser with the laser scanning optics over a laser cladding cycle, the laser cladding cycle including at least one bead scanning pattern;
    wherein the at least one bead scanning pattern includes a bead scan and a pre-clean scan,
        the bead scan including forming a molten bead of cladding material at the surface, and
        the pre-clean scan includes scanning forward of the bead scan in a cladding direction to clean a portion of the surface for a subsequent bead scan of the laser cladding cycle.

12. The method of claim 11, wherein the at least one bead scanning pattern includes a pre-heat scan, the pre-heat scan includes scanning forward of the bead scan in the cladding direction to pre-heat a second portion of the surface for a subsequent bead scan of the laser cladding cycle.

13. The method of claim 11, wherein the at least one bead scanning pattern includes a post-heat scan, the post-heat scan includes scanning behind the bead scan in a direction opposite the cladding direction to re-heat a previously formed bead of cladding material.

14. The method of claim 12, wherein the at least one bead scanning pattern includes a post-heat scan, the post-heat scan includes scanning behind the bead scan in a direction opposite the cladding direction to re-heat a previously formed bead of cladding material.

15. The method of claim 11, wherein a first number of passes for the bead scan is performed prior to the pre-clean scan and a second number of passes for the bead scan is performed after the pre-clean scan.

16. The method of claim 11, wherein a material with a hardness above Rockwell C 45 is applied to the machine component during each bead scan.

17. The method of claim 11, wherein a material is applied to the machine component during each bead scan of the laser cladding cycle to remanufacture the machine component.

18. A laser cladding system for cladding a material to a surface of a machine component, the laser cladding system comprising:
   a laser scanning head including
      a laser source which produces a beam, and
      laser scanning optics which receives and directs the beam;
   a laser control system including
      a processor,
      a beading module configured to control the laser scanning head to direct the beam with the laser scanning optics during a bead scan to form a molten bead of cladding material at the surface of the machine component, and
      a pre-cleaning module configured to control the laser scanning head to direct the beam with the laser scanning optics during a pre-clean scan to remove impurities from the surface prior to a subsequent bead scan.

19. The laser cladding system of claim 18, wherein the laser control system also includes a pre-heating module configured to control the laser scanning head to direct the beam with the laser scanning optics during a pre-heat scan to control a temperature differential between a bead of cladding material and the surface of the machine component.

20. The laser cladding system of claim 18, wherein the laser control system also includes a post-heating module configured to control the laser scanning head to direct the beam with the laser scanning optics during a post-heat scan to control a cooling period of each bead of cladding material applied to the surface of the machine component.

* * * * *